United States Patent [19]

Edgar et al.

[11] Patent Number: 4,554,850
[45] Date of Patent: Nov. 26, 1985

[54] MACHINE FOR CUTTING V-BELTS FROM A V-BELT BAND

[76] Inventors: James W. Edgar; Edward J. Edgar, both of 55 Ayers Rd., Eugene, Oreg. 97401

[21] Appl. No.: 632,394

[22] Filed: Jul. 19, 1984

[51] Int. Cl.[4] .......................... B29H 7/22; B29H 3/06; B26D 1/02
[52] U.S. Cl. ........................................ 83/178; 83/422; 83/425; 83/431; 83/436; 83/444; 83/448; 83/368; 83/925 EB
[58] Field of Search ................. 83/178, 368, 422, 425, 83/425.2, 431, 436, 444, 448, 925 ED

[56] References Cited

U.S. PATENT DOCUMENTS

| | | | |
|---|---|---|---|
| 1,356,271 | 10/1920 | Dozier et al. | 83/436 |
| 1,881,020 | 10/1932 | McFarland | 83/441 |
| 3,701,186 | 10/1972 | Kuts | 83/925 EB X |
| 4,368,656 | 1/1983 | Howerton et al. | 83/178 |
| 4,488,465 | 12/1984 | Brand et al. | 83/925 EB X |

Primary Examiner—Donald R. Schran
Attorney, Agent, or Firm—James D. Givnan, Jr.

[57] ABSTRACT

A machine for cutting one or more V-belts from a band of several V-belts and including a base on which are journalled parallel, powered rolls driven as by a hand crank. A frame above the base adjustably supports a carriage positionable transversely of a V-belt band. Wheels of the carriage urge the V-belt into roll engagement to enable the V-belt band to be driven past a carriage supported knife body to sever a web between two V-belts. Preparatory to belt cutting, the frame is positionable upwardly from the machine base about a horizontal axis. The carriage knife body may automatically move transversely of the V-belt band to center a knife blade between adjacent V-belts.

10 Claims, 4 Drawing Figures

U.S. Patent  Nov. 26, 1985  4,554,850
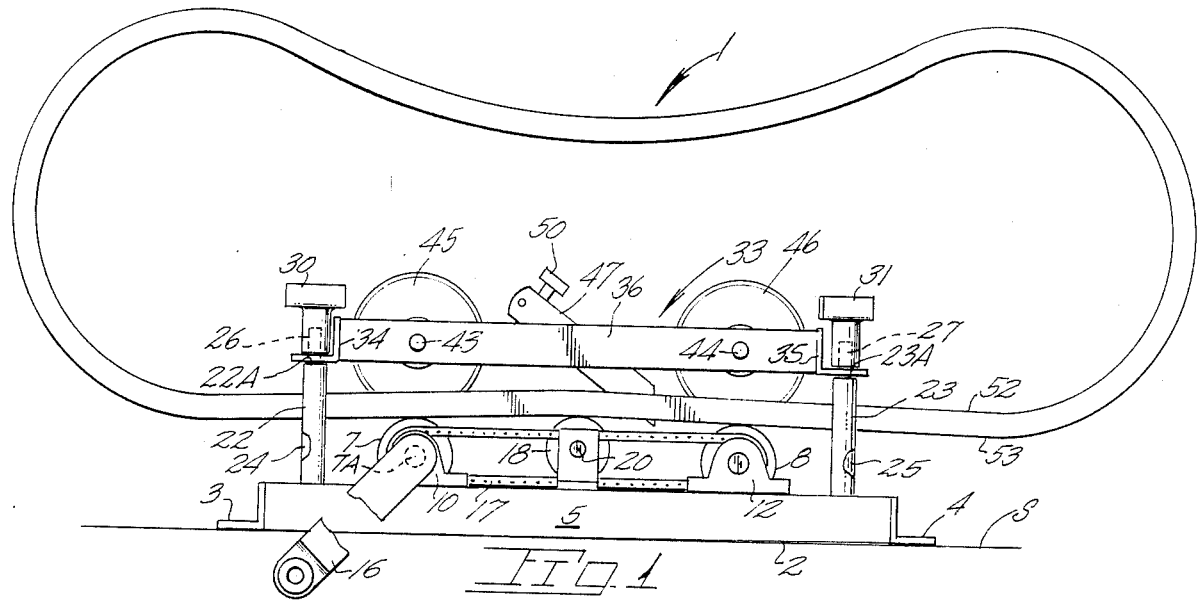
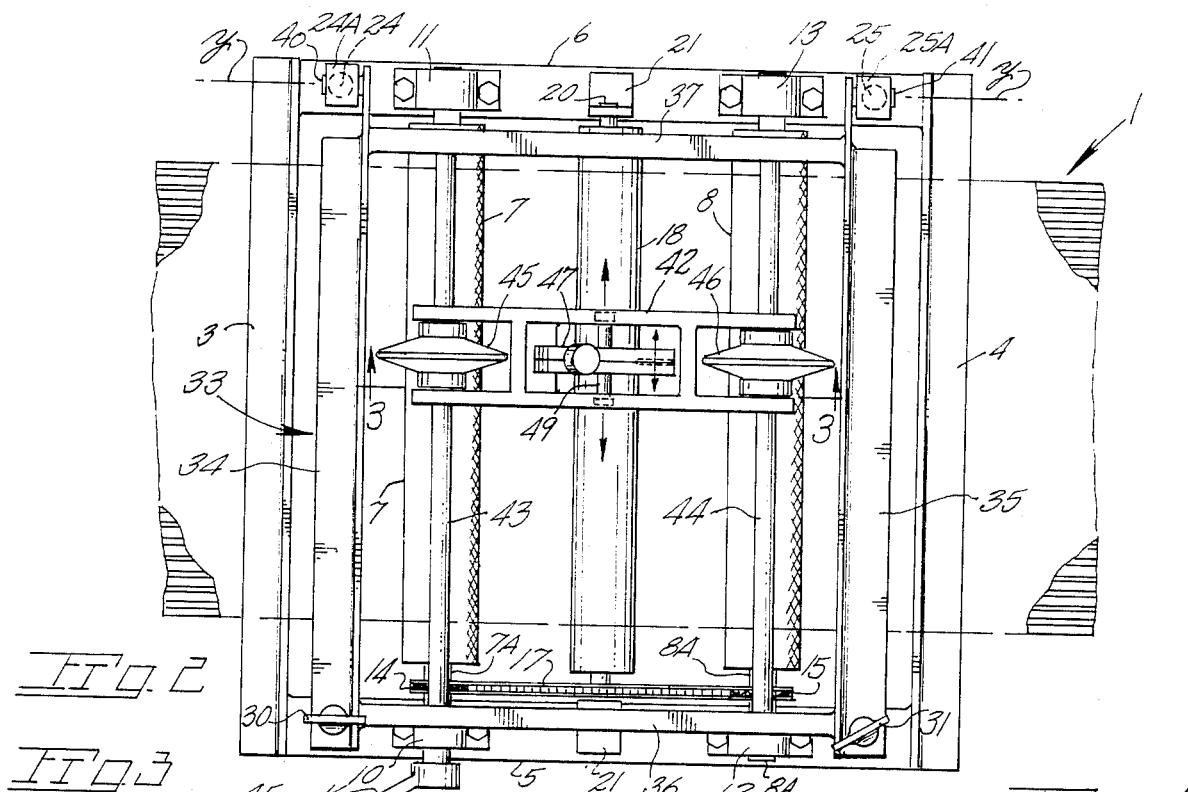
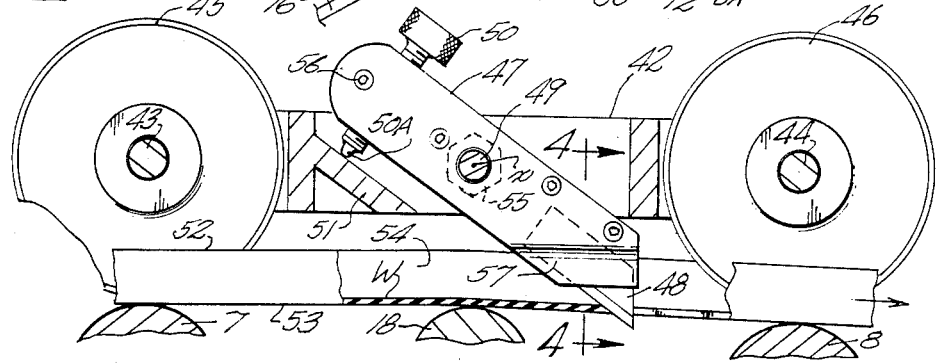
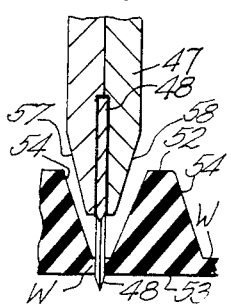

MACHINE FOR CUTTING V-BELTS FROM A V-BELT BAND

BACKGROUND OF THE INVENTION

The present invention pertains generally to machines having as their function the severing of a V-belt from a band of endless V-belts joined by common webs.

V-belts as commonly used in power transmission applications are manufactured in bands comprised of several V-belts. The user of V-belts often has a need for more or fewer V-belts than is in an available band and accordingly, it is necessary for the seller or user to sever the band to provide the number of V-belts desired. In some instances the cutting of a V-belt from a band of V-belts has been done with a hand-held knife drawn along the common web joining adjacent V-belts. This practice entails a time consuming, tedious cutting operation with the risk of V-belt damage should the knife blade go astray.

In the known prior art, U.S. Pat. No. 4,368,656 discloses a manual tool for placement within a vise and having a pair of wheels for V-belt guidance past a fixed blade. Such a tool does not conveniently lend itself to the cutting of heavy duty industrial V-belts several feet in length since the V-belt band must be manually drawn past the blade. Further, with each V-belt severed the heavy belt band must be lifted and reentrained on band supporting wheels and the band forced initially down over the blade tip prior to initiating a cutting operation.

SUMMARY OF THE PRESENT INVENTION

The present invention is embodied within a machine for driving a V-belt band past a cutting element which is positionable so as to separate a selected belt or belts from the band.

Cooperating powered rolls are journalled on a machine base and support a band of multiple V-belts to impart travel to same past a knife. The knife is part of a carriage which additionally includes wheels which track along a common groove defined by adjacent V-belts. Said carriage is adjustably supported by a frame to permit carriage and knife positioning transversely of the V-belt band for cutting along a desired path. The frame is vertically positionable on the machine base to enable removal and relocating of the carriage wheels in a new V-belt groove preparatory to a second belt cutting operation. Provision is made for centering the knife blade between V-belts to provide uniform severing of a belt joining web.

Important objectives of the present machine include the provision of a machine for severing an endless V-belt or a plurality thereof from a band of V-belts in a rapid manner without risk of damage to the belts; the provision of a V-belt cutting machine which is readily adjustable into position for the cutting of several V-belts in a sequential manner; the provision of a V-belt cutting machine wherein the band of V-belts is driven by powered rolls past a knife component; the provision of a V-belt cutting machine wherein a blade component is at all times centrally located between the V-belts being separated; the provision of a V-belt cutting machine wherein the cutting angle of a blade element may be adjusted to best suit the web thickness between a pair of V-belts being severed.

BRIEF DESCRIPTION OF THE DRAWING

In the accompanying drawing:

FIG. 1 is a front elevational view of the present machine with an endless V-belt band in place thereon;

FIG. 2 is a plan view of FIG. 1 with the V-belt band shown in fragmentary form;

FIG. 3 is a vertical sectional view taken along line 3—3 of FIG. 2 and showing carriage details;

FIG. 4 is a vertical sectional view taken along line 4—4 of FIG. 3 showing knife details.

DETAILED DESCRIPTION OF THE INVENTION

With continuing attention to the drawing wherein reference numerals indicate parts hereinafter similarly identified, the reference numeral, indicates generally a band of V-belts installed in the present machine for the purpose of cutting one or more V-belts from the band.

Indicated at 2 is a base of the present belt cutting machine having side members 3 and 4 joined at their front and rear ends by a front member 5 and a rear member 6 to provide a rigid base structure for suitable attachment to a work surface S.

On said base are parallel rolls 7 and 8 journalled within pairs of bearings 10, 11 and 12, 13. Roll shafts at 7A, 8A are provided with sprockets 14 and 15 which constitute part of a roll drive means. Shaft 7A extends past bearing 10 to receive a hand crank 16. A roller chain 17 imparts rotation to sprocket 15 and roll 8. The surfaces of the rolls may be knurled for purposes of traction with band 1.

A roll at 18 supports that position of belt band 1 located medially of the powered rolls 7 and 8 and provides a back-up for band 1 proximate the cutting function of a later described knife. Roll 18 may be an idler roll carried by a shaft 20 supported by base mounted brackets 21.

In place adjacent the corners of the base are support means shown as forward posts 22-23 and rearward posts 24-25 the latter pair of posts terminating upwardly in bearing blocks 24A-25A. Forward posts 22-23 are shouldered at 22A-23A and each includes a threaded stud at 26-27. Hold down thumbscrews at 30-31 serve to confine the forward end of a later described frame in place on the forward posts.

The present belt cutting machine further includes a frame indicated generally at 33 having side rails at 34 and 35 with front and rear cross members at 36 and 37. The side rails may be embodied in lengths of angle iron apertured at their forward ends to seat downwardly about the threaded studs 26-27 to rest on the post shoulders 22A-23A. The rearward ends of the rails are provided with pintles 40-41 which are journalled within bearing blocks 24A-25A for rotation about an axis y. Accordingly in the frames lowermost, operative position it is vertically spaced from and in parallel with the machine base.

The frame additionally includes a carriage at 42 adapted for fore and aft adjusted movement along shafts at 43, 44 which terminate in the frame cross members 36-37. Said shafts additionally function as axles for idler wheels 45 and 46 confined respectively between opposite ends of the carriage. From the foregoing it will be evident that the carriage is manually positionable fore and aft and transversely of V-belt band 1 subsequent to the wheels 45, 46 being elevated out of tangential relationship with that segment of the band on rolls 7 and 8.

For wheel traction with the sides of adjacent V-belts it has been found desirable to shape the wheels so as their sides define an included angle of about 40 degrees. The wheel perimeter preferably is at all times spaced from the belt web W.

Carriage 42 includes a knife body 47 having a blade 48. A bolt member 49 on the carriage supports the knife body in a movable manner preferably permitting both lateral and rotational movement of said body along and about an axis x. Positioning screw means at 50 is in the threaded engagement with the knife body and has an end 50A for abutment with a carriage member 51 to permit adjustment of the pitch of blade 48 to best sever the thickness of the web being cut. With reference to FIG. 4 typical V-belts include inner and outer walls 52-53 with non-parallel or inclined side walls 54. Such belts are of molded, composite construction including reinforcing elements (not shown) in most instances. The webs at W joining adjacent belts in belt band 1 do not have reinforcing elements therein.

The knife body is removable from the carriage upon removal of a nut 55 from bolt 49. Blade replacement in the removed knife body is achieved by removal of flush mounted, socket head machine screws 56.

A lower portion of knife body 47 has downwardly and inwardly tapered sides as at 57 and 58 which tend to automatically center the knife body along axis x, and more importantly center the blade 48 between adjacent V-belts to sever the web W in an even manner without risk of belt damage.

In a belt cutting operation, the frame 33 is positioned away from the base 2 to permit a V-belt band to be deposited on rolls 7 and 8 and idler roll 18. Lowering of the frame about axis y causes wheels 45, 46 to enter a V-belt defined groove with the wheel boundary coming into contact with belt side walls 54. Said wheels confine the band downwardly into frictional engagement with powered rolls 7 and 8 therebelow which jointly transfer the band past blade 48.

When cutting various bands, each having a different belt size, it may be desirable to have knife bodies 47 of different widths to assure a knife body of a width to automatically center blade 48 between V-belt walls 54 or at least confined against belt damaging excursions from an optimum central course.

While we have shown but one embodiment of the invention it will be apparent to those skilled in the art that the invention may be embodied still otherwise without departing from the spirit and scope of the invention.

Having thus described the invention, what is desired to be secured in Letters Patent is:

1. A machine for cutting a V-belt from a band of V-belts wherein adjacent belts are joined by a severable web, said machine comprising, a base,
rolls journalled on said base and on which a V-belt may be supported,
drive means for imparting rotation to said rolls,
a frame,
support means on said base movably mounting said frame above said base, and
a carriage slidably carried by said frame for travel along a path parallel to the axes of said rolls transversely of a band of V-belts thereon, said carriage having radially aligned belt engaging wheels for rolling engagement with adjacent V-belts and spaced above the web joining the said V-belts, a knife body on said carriage body having a blade for disposition in the path of the last mentioned web.

2. The machine claimed in claim 1 wherein said drive means includes a hand crank for imparting rotation to one of said rolls, a roller chain and sprocket drive for driving another of said rolls in a timed manner with said one of said rolls.

3. The machine claimed in claim 1 wherein said base includes a band back-up roll disposed subjacent the carriage knife.

4. The machine claimed in claim 1 wherein said support means includes bearing means, said frame adapted for movement about a horizontal axis passing through said bearing means.

5. The machine claimed in claim 4 wherein said support means additionally includes posts located at the opposite extremity on said base from said bearing means, said posts supporting said frame in a uniformly spaced manner above said base, hold down screws confining said frame against upward displacement during a belt cutting operation.

6. The machine claimed in claim 1 wherein said frame includes carriage supporting shafts located superjacent said rolls and permitting carriage positioning across the width of a V-belt band.

7. The machine claimed in claim 6 wherein said belt engaging wheels are rotatably mounted on said carriage supporting shafts.

8. The machine claimed in claim 1 wherein said carriage includes knife body mounting means on said carriage permitting knife body movement about a horizontal axis, adjustable means positioning said knife body about the last mentioned horizontal axis.

9. The machine claimed in claim 8 wherein said knife body mounting means additionally mounts said knife body for movement along said horizontal axis.

10. The machine claimed in claim 1 wherein said knife body is of sectional configuration so as to be positionable between a pair of V-belts being severed from one another and substantially occupying a distance therebetween whereby the knife body blade is uniformly spaced between the V-belts.

* * * * *